UNITED STATES PATENT OFFICE.

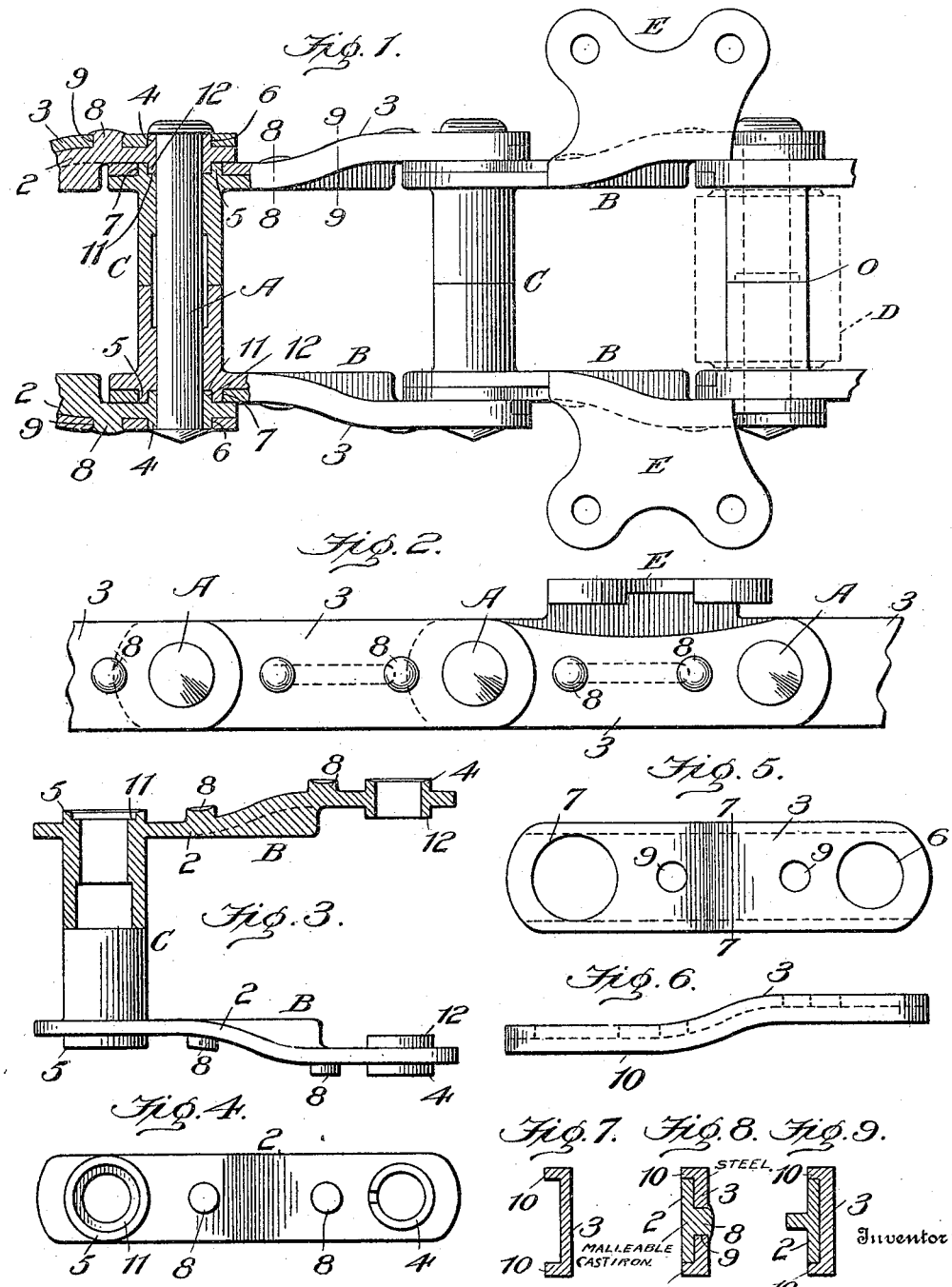

CHRISTOPHER W. LEVALLEY, OF MILWAUKEE, WISCONSIN.

CHAIN.

No. 820,219.      Specification of Letters Patent.      Patented May 8, 1906.

Application filed July 19, 1905. Serial No. 270,403.

*To all whom it may concern:*

Be it known that I, CHRISTOPHER W. LE-VALLEY, a citizen of the United States, residing at Milwaukee, in the county of Milwaukee and State of Wisconsin, have invented a certain new and useful Chain, of which the following is a specification.

My present invention relates to chains, and is particularly intended to be used in the manufacture of chains for driving and conveyer purposes, though in its useful applications it is not necessarily limited to chains of this character.

It consists of a composite chain the parts of which are formed of a metal of great strength, such as steel, to be used for the parts that bear the principal strains of the chain and of another metal better adapted for wearing or articulating parts—as, for instance, malleable-iron casting.

The invention also consists of other improvements in construction that will be hereinafter pointed out.

In the accompanying drawings I have illustrated my invention as applied to a drive or conveyer chain the links of which differ somewhat from each other in order to illustrate the different forms of my invention.

Figure 1 is a view, partly in horizontal section and partly in elevation, of a chain embodying my improvements, the several links being somewhat different from each other in construction. Fig. 2 is an edge view of the chain represented in Fig. 1. Fig. 3 is a view, partly in plan and partly in section, of the malleable cast-iron portion of a chain-link embodying one form of my invention. Fig. 4 is a side or edge view of the portion of the link represented in Fig. 3. Fig. 5 is a side view of one of the steel strengthening parts used in connection with a link like that represented in Figs. 3 and 4. Fig. 6 is an edge view of the part shown in Fig. 5. Fig. 7 is a cross-sectional view taken on the line 7 7 of Fig. 5. Fig. 8 is a cross-sectional view on the line 8 8 of Fig. 1. Fig. 9 is a cross-sectional view on the line 9 9 of Fig. 1.

I have represented my invention as being applied to a chain that in its main features is well known in the art. It is composed of a series of links connected by cross bars or pintles A and each formed of side bars B B and end bars C, the latter being tubular and having the pintles pass through them. The cross or end bars of the links may extend continuously from side bar to side bar, as represented in Fig. 3, or they may be divided, as represented in dotted lines at O in Fig. 1, where the end bar is represented as formed of two tubular portions extending inward toward each other from the opposite side bars and surrounded by a sleeve or roller D, that operates to hold the two parts of the end bar together and in line with each other. However, as my present invention does not relate to the construction of the cross or end bars of the link, I will confine the further description of my invention to the form of link having a continuous end bar such as represented in Fig. 3.

Referring particularly to Figs. 1, 8, and 9, it will be observed that the side bars B of the chain are each formed of two parts, these parts being of different metals. The portion 2 of the side bar is formed integral with the end bar and is preferably constructed of malleable cast-iron, as this material is best adapted for the articulating parts of the chain. Applied to this part 2 of the side bar is a strengthening-piece 3, formed, preferably, of steel. The malleable cast portion 2 of each side bar is formed at its outer or free end with a perforated hub portion 4, that is adapted to be brought into alinement with the aperture in the cross-bar C of the link with which it is coupled and to constitute a portion of the bearing for the connecting-pintle A. At the opposite end the portion 2 of the side bar is preferably provided with a hub or boss 5, that is concentric with the aperture through the end bar C.

The strengthening-piece 3 is shaped to fit closely to the outer face of the side bar and is preferably provided with apertures 6 and 7, arranged to fit, respectively, over the hubs or bosses 4 and 5, already described. As the means for securely uniting the strengthening-piece 3 to the portion 2 of the side bar I prefer to provide the latter with one or more studs or projections 8, arranged to pass through apertures 9 in the strengthening-strip and to have their outer ends upset or riveted, as represented in the sectional part of Fig. 1. I prefer that the steel strengthening-strip should be made of channel-steel, as this construction not only provides an outer covering for the side bars, but also a covering for the upper and lower edges thereof formed by the flanges 10 of the channel-bars. One or both of these flanges, however, might be omitted. I have found it desirable to use a strengthening-piece without flanges or with only one when it is applied to a chain provided with lateral projections for attaching cross-slats or other parts to the chain, as represented at E E in Figs. 1 and 2. In this construction it is not convenient to use a flange in connection with that edge of the strengthening-strip 3 that is next to the projections E. I prefer that the hubs or bosses 5 should be formed with an internal rabbet or channel 11, concentric with the opening through the end bar C, and that the free ends of the side bars should be provided with inward-extending hubs or bosses 12, arranged to fit into the recesses formed by the rabbets 11, between the pintle and the bosses or hubs 5, as is clearly represented in Fig. 1. There are thus formed interlocking parts between each contiguous link concentric with the joint uniting them, and these parts are all of malleable metal.

By my invention I am enabled to produce a chain of great strength and yet in which the main portions and practically all the articulating parts are of malleable cast-iron. The chain is light for its strength, has large wearing-surfaces at the joints, and may be cheaply and easily constructed.

Any suitable means may be employed for preventing the pintles from turning and for securing them in place after the chain is assembled. The links are coupled together by springing apart the free ends of the side bars and bringing the interlocking portions into locking engagement with each other, after which the pintles are inserted and secured in place—as, for instance, by upsetting or riveting the ends, as represented in the drawings.

Having described my invention, what I claim, and desire to secure by Letters Patent, is—

1. A chain composed of links connected by cross-bars, each link having a tubular end bar and perforated side bars, whereby are formed pintle-seats, and the side bars of the links being composite and formed of metal of different qualities, substantially as and for the purpose set forth.

2. A chain formed of articulated links having side bars and end bars, the end bars and portions of the side bars being of malleable metal, and the side bars being strengthened by steel strips secured to the malleable portions of the side bars, substantially as set forth.

3. A chain formed of links united by pintles, each link having a hollow end bar and side bars, the end bar and side bars being formed together of malleable cast-iron, and each side bar being strengthened by a strip of steel secured to one face thereof, substantially as set forth.

4. A chain having side bars formed of malleable cast-iron and strips of steel secured to the outer faces thereof, said strips being flanged and such flanges overlying edges of the side bars, substantially as set forth.

5. A chain having composite side bars formed of inner portions of malleable cast-iron and strengthening-bars of steel, the steel bars being of channel form and secured to the outer faces of the malleable portions of the side bars with the flanges of the steel strengthening-bars overlying the opposite edges of the malleable portions of the side bars, substantially as set forth.

6. A chain having composite side bars formed of the malleable cast-iron portions 2 provided with studs 8, and the strengthening steel strips 3 arranged to lie close against the faces of the parts 2 and formed with apertures through which the studs extend, the studs serving as rivets for uniting the two parts of the side bars, substantially as set forth.

7. A chain formed of articulated links, the articulated portions being formed of malleable cast-iron and the side bars being composite and formed in part of steel, substantially as set forth.

8. A chain formed of links and connecting-pintles, each link having a tubular end bar of malleable metal and a pair of malleable-metal side bars, the side bars being strengthened by pieces of steel secured to the outer faces thereof, such strengthening-pieces being perforated in line with the pintle-openings through the side bars, whereby such strengthening-pieces extend beyond the pintles in both directions, substantially as set forth.

9. A chain formed of links and connecting-pintles, each link having a tubular end bar of malleable metal and a pair of malleable-metal side bars, each side bar being provided near one end with an outward-extending hollow hub or boss concentric with the opening for the pintles, and strengthening-pieces for the side bars secured to the outer faces thereof, such strengthening-pieces being perforated near their ends to fit over the said projections or bosses of the side bars, substantially as set forth.

10. A chain formed of links and connecting-pintles, the side bars of the links being provided with interlocking parts at the joints of the chains, and the articulating parts of the links including the said interlocking parts being formed of malleable metal, while the longitudinal parts of the links between the joints are formed in part of steel, substantially as set forth.

11. A chain formed of links having hollow end bars, side bars and connecting-pintles passing through the end bars and side bars, the side bars being provided with outward-projecting hubs or bosses 5 concentric with the pintle-openings through the end bars and such hubs being internally recessed as at 11, and the opposite ends of the side bars being provided with inward-extending hubs or bosses 12 adapted to fit into the recesses 11 of the links to which they are coupled, and strengthening-pieces secured to the outer faces of the side bars, substantially as set forth.

CHRISTOPHER W. LEVALLEY.

Witnesses:
V. I. KLOFANDA,
JOSEPH LOCH.